March 10, 1959 D. ROSENBERG ET AL Re. 24,618

INFLATABLE CUSHION

Original Filed July 19, 1954 2 Sheets-Sheet 1

INVENTORS
David Rosenberg
& Louis Mirando

BY Henry Ruhl

ATTORNEY

INFLATABLE CUSHION

Original Filed July 19, 1954 2 Sheets-Sheet 2

INVENTORS
David Rosenberg
& Louis Mirando
BY Henry Rubel
ATTORNEY

United States Patent Office

Re. 24,618
Reissued Mar. 10, 1959

24,618

INFLATABLE CUSHION

David Rosenberg and Louis Mirando, New York, N. Y., assignors to The Holiday Line, Inc., New York, N. Y., a corporation of New York Original No. 2,803,023, dated August 20, 1957, Serial No. 444,132, July 19, 1954. Application for reissue April 28, 1958, Serial No. 749,041

6 Claims. (Cl. 9—17)

Matter enclosed in heavy brackets [ ] appears in the original patent but forms no part of this reissue specification; matter printed in italics indicates the additions made by reissue.

The present invention relates to buoyant cushions especially designed and constructed to serve as life preservers; and, more particularly, although not necessarily exclusively, to a novel watertight filled cushion having means incorporated therewith so that the cushion can be adjusted for individual comfort when in use as a cushion, and, also, is readily available for use as a life preserver.

The usual life preserver cushion is stitched and manufactured from coated cloth. Moisture and rain seeps through the stitches making the filler damp, decreasing its buoyancy and making the cushion less effective as a life preserver. Straps on the known type of life preserver cushion are stitched, contributing to structural weakness. These prior art cushions must be dried after exposure to dampness or rain, and are, therefore, not always ready for life preserver use.

The present invention provides a life preserver cushion having many features of novelty which make it readily available as a buoyant and safe life preserver. In addition, the cushion of this invention is comfortable when in use as a cushion and adds to the smart appearance of any vessel in which it is used.

In accordance with the present invention, a watertight plastic cushion is provided. This is accomplished by electronically welding all seams so that seamless construction, in effect, is achieved. The essential strap structure is fully adjustable, as will hereinafter appear, and is safely connected to the cushion in a permanent manner while not imposing tearing stresses on the cushion body. The cushion of the present invention is filled with kapok, for example, or other expansive material which is cellular and air-retaining. Admission of air is controlled by an air valve which is closed, normally, when the filler is fully expanded. In this condition, the cushion has maximum buoyancy. The air valve may be opened to adjust the cushion of this invention for individual comfort when used as a seat cushion. Excess air is released and the valve is closed. Opening [and closing] of the valve admits air *due to the cellular nature of the filler material* and restores buoyancy *to the cushion which thereby returns to its expanded shape.*

It will be seen, therefore, that the principal object of the present invention is to provide a novel buoyant life preserver cushion having structural features and affording the advantages outlined above.

Another object is to provide a watertight cushion having a welded and substantially unitary body.

A further object is to provide a life preserver cushion having a valve arrangement cooperating in a novel manner with the principal cushion structure.

[A still further object is to provide a life preserver cushion having a valve arrangement cooperating in a novel manner with the principal cushion structure.]

A still further object is to provide a life preserver cushion having a novel strap structure.

A still further object is to provide a life preserver cushion having a novel strap accommodating means.

Other and, perhaps, more specific objects will appear as the following description proceeds with reference to the accompanying drawing in which.

Figure 1:
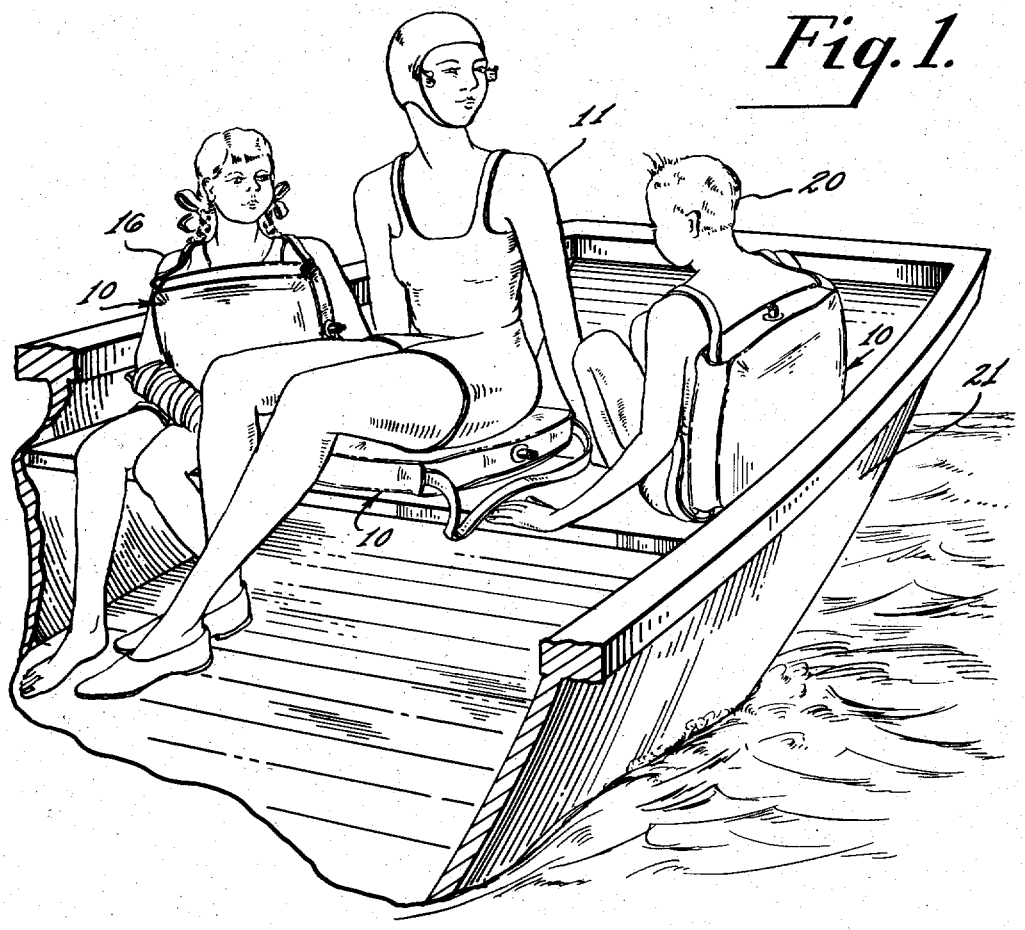
Fig. 1 is a pictorial view showing several suggested uses of a life preserver cushion embodying the present invention.
Figure 2:
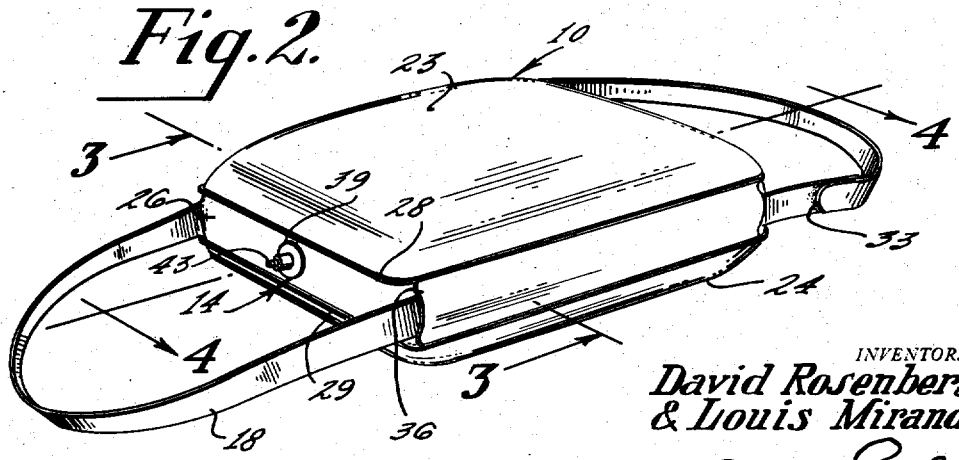
Fig. 2 is a view in perspective of a life preserver cushion constructed in accordance with this invention.
Figure 3:
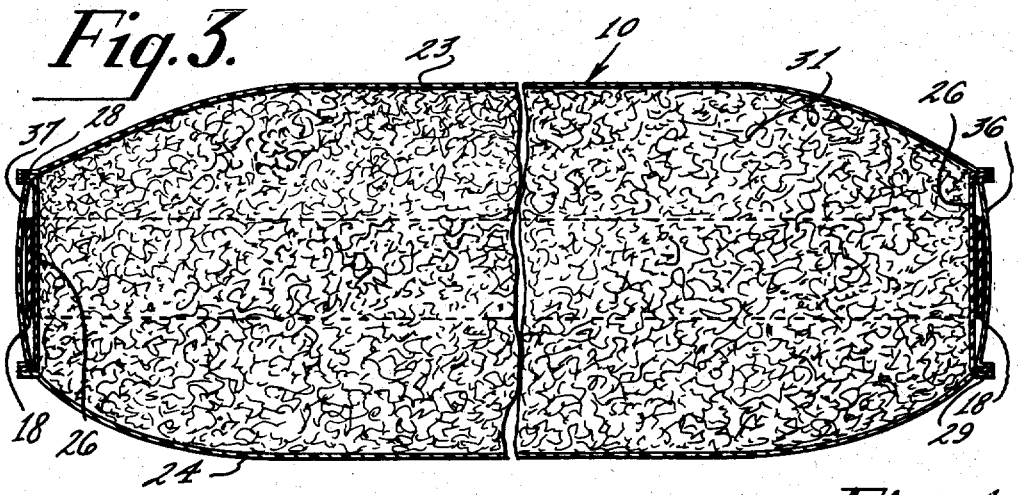
Fig. 3 is a view in sectional elevation on line 3—3 of Fig. 2.

Referring to the drawing in detail, and for the present to Fig. 1, the cushion 10 (Fig. 2) of this invention is shown in use by the central seated figure 11 as a cushion. The air valve 14 will have been manipulated to release air to provide a comfortable seat. The figure 16 at the left shows use of the life preserver cushion by an injured person. The strap 18 is looped around the neck of the figure 16 and hangs freely in front. For this purpose, the strap 18 projects entirely from one end of the cushion 10. The figure 20 at the right shows the usual use of the cushion 10 wherein each arm is thrust through a projecting strap loop. The cushion is worn somewhat like a knapsack. The figures 11, 16 and 20 are shown in a boat 21, each being protected in case of emergency.

The cushion 10 comprises a top part or panel 23, a bottom part or panel 24, and a substantially continuous side wall 26. The latter is or may be composed of a single strip with its free ends electronically welded to provide a continuous member. The electronic welding process is by now well known and is carried out by placing parts to be joined in a high frequency electric field existing between suitable electrodes. The panels 23 and 24 and wall 26 are cut from suitable material such, for example, as sheet plastic. A preferred material is Firestone "Velon." This named material is available on the market and is capable of being electronically welded. This is in the nature of an extruded embossed vinyl plastic.

The top part 23 is welded along a seam 28 to the side wall 26. Similarly, the bottom part 24 is welded along a seam 29 to the side wall 26. These seams provide a completely watertight *envelope* structure. Prior to the final seaming operation the filler 31 is placed in the body of the cushion. The preferred filler is 20 oz. blown new Java kapok.

The strap 18 is butt sealed or welded as at 33 to form a complete loop. The strap 18 is formed of extended embossed vinyl. It may also be made of Firestone "Velon." A tunnel is provided at each side of the cushion 10 to slidably receive the strap 18. This is accomplished by providing pieces of strips 36 and 37 which are integrally joined at their edges during the welding process to the side wall 26 at the seams 28 and 29. This provides tunnels through which the strap 18 extends and is freely slidable.

Figure 4:
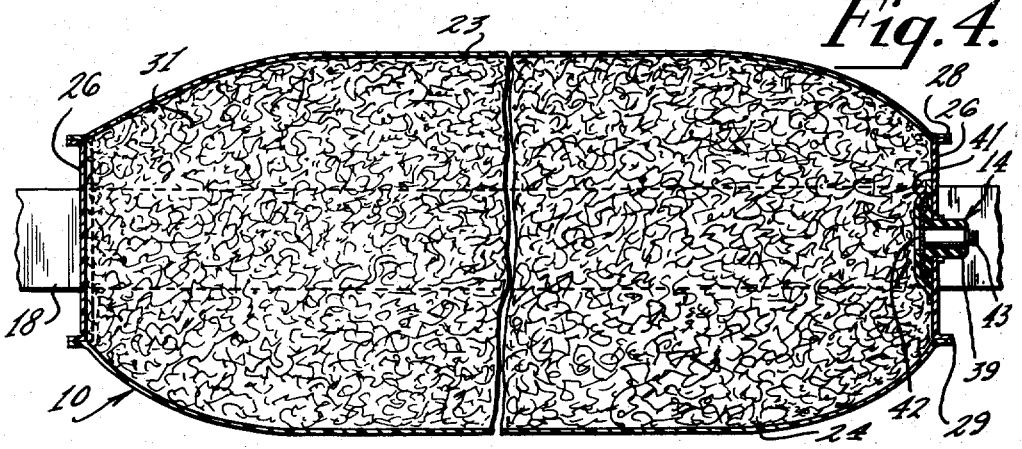
Fig. 4 is a view in sectional elevation on line 4—4 of Fig. 2.
Figure 5:
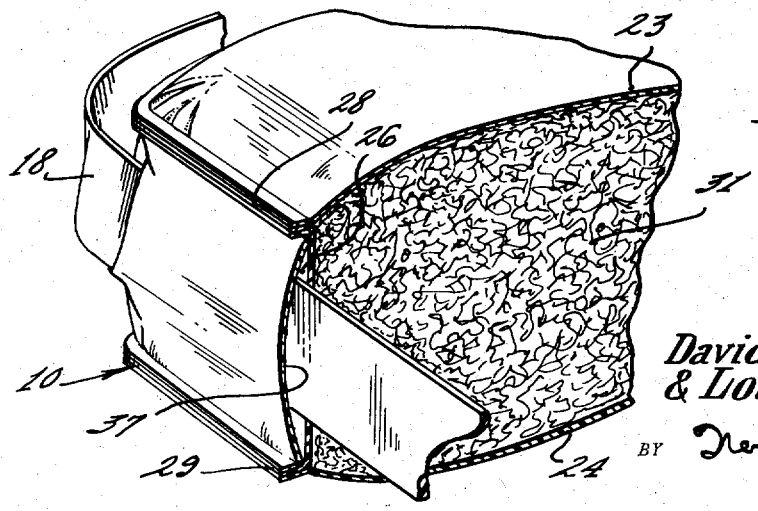
Fig. 5 is a fragmentary perspective view showing the strap and strap retaining means in detail.

The previously mentioned valve, indicated generally by reference character 14, is shown more in detail in Fig. 4. A commercially available valve may be used when constructing a cushion involving this invention. A suitable valve is a Halky-Roberts metal valve. The valve body is surrounded by a plastic sleeve 39. A backing sheet 41 of plastic underlies the valve and retains a wire screen 42. The valve is opened by unscrewing the knurled piece 43. It is closed by screwing in this knurled piece. When the valve is open, expansion of the filler draws in air. This gives maximum buoyancy which is retained by closing the valve. When the cushion 10 is to be used as a seat cushion, the valve is opened to vent out some of the air to provide a flatter cushion. After use as a cushion, the valve is opened to admit air and is then closed. The cushion 10 is then ready for use as a life preserver.

From the foregoing it will be seen that the present invention provides a safe and efficient life preserver and, also, a cushion of general utility. Life preserver cushions constructed in accordance with the present invention are approved for use by the authorities as life preservers.

The claimed invention is:

*1.* A life preserver cushion comprising a top part, a bottom part and a substantially continuous side wall, welded seams joining said parts to said side wall, a pair of oppositely disposed strips seam welded to said side wall to provide strap tunnels, a substantially continuous strap slidably received in said tunnels, and an air valve mounted in said side wall.

*2. An inflatable cushion comprising a sealed envelope of flexible material defining a collapsible chamber, resilient cellular filler material disposed in said chamber in a quantity filling said envelope to provide a compressible cushion, and an air valve attached to said envelope in communication with said chamber and operable to permit air to be driven from said chamber when said filler material is compressed and to permit air to be drawn into said chamber as said filler expands after pressure has been released therefrom whereby said cushion assumes substantially its original shape.*

*3. An inflatable cushion comprising a sealed envelope of flexible material defining an airtight and watertight collapsible chamber, resilient cellular filler material disposed in said chamber in quantity filling said envelope to provide a compressible cushion, strips attached to opposite sides of said envelope to provide strap tunnels, a substantially continuous strap slidably received in said tunnels, and an air valve attached to said envelope in communication with said chamber and operable to permit air to be driven from said chamber when said filler material is compressed and to permit air to be drawn into said chamber as said filler expands after pressure has been released therefrom whereby said cushion assumes substantially its original shape.*

*4. An inflatable cushion comprising a sealed envelope of flexible material defining an airtight collapsible chamber, resilient cellular filler material disposed in said chamber in a quantity filling said envelope to provide a compressible cushion, said envelope including a top wall, a bottom wall and a substantially continuous side wall, welded seams joining said top and bottom walls to said side wall, and an air valve attached to said envelope in communication with said chamber and operable to permit air to be driven from said chamber when said filler material is compressed and to permit air to be drawn into said chamber as said filler expands after pressure has been released therefrom whereby said cushion assumes substantially its original shape.*

*5. A life preserver cushion comprising a sealed envelope of flexible material defining an airtight and watertight collapsible chamber, cellular filler material disposed in said chamber in a quantity filling said envelope to provide a compressible cushion, said envelope including a top wall, a bottom wall and a substantially continuous side wall, welded seams joining said top and bottom walls to said side wall, strips attached to opposite sides of said side wall to provide strap tunnels, and a substantially continuous strap slidably received in said tunnels.*

*6. A life preserver cushion comprising a sealed envelope of flexible material defining an airtight and watertight collapsible chamber, resilient cellular filler material disposed in said chamber in a quantity filling said envelope to provide a compressible cushion, said envelope including a top wall, a bottom wall and a substantially continuous side wall, welded seams joining said top and bottom walls to said side wall, strips attached to opposite sides of said side wall to provide strap tunnels, a substantially continuous strap slidably received in said tunnels, and an air valve attached to said envelope in communication with said chamber and operable to permit air to be driven from said chamber when said filler material is compressed and to permit air to be drawn into said chamber as said filler expands after pressure has been released therefrom whereby said cushion assumes substantially its original shape.*

References Cited in the file of this patent or the original patent

UNITED STATES PATENTS

| | | |
|---|---|---|
| 1,381,700 | Bressler | June 14, 1921 |
| 1,661,690 | Buchman | Mar. 6, 1928 |
| 1,941,785 | Brown | Jan. 2, 1934 |
| 2,132,544 | Shaw | Oct. 11, 1938 |
| 2,310,840 | Crabtree | Feb. 9, 1943 |
| 2,405,484 | Bailhe | Aug. 6, 1946 |
| 2,620,493 | Brelsford | Dec. 9, 1952 |

FOREIGN PATENTS

| | | |
|---|---|---|
| 324,076 | Great Britain | Jan. 17, 1930 |
| 601,211 | France | Nov. 26, 1925 |
| 860,129 | France | Sept. 24, 1940 |